US012636921B2

(12) United States Patent
Borkholder

(10) Patent No.: US 12,636,921 B2
(45) Date of Patent: May 26, 2026

(54) HITCH AND METHOD OF MANUFACTURE

(71) Applicant: Gen-Y Creations, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 480 days.

(21) Appl. No.: 18/382,082

(22) Filed: Oct. 20, 2023

(65) Prior Publication Data

US 2025/0128552 A1     Apr. 24, 2025

(51) Int. Cl.
*B60D 1/06* (2006.01)
*B21D 53/88* (2006.01)
*B60D 1/46* (2006.01)

(52) U.S. Cl.
CPC .............. *B60D 1/06* (2013.01); *B21D 53/88* (2013.01); *B60D 1/46* (2013.01)

(58) Field of Classification Search
CPC ............. B60D 1/06; B60D 1/46; B21D 53/88

USPC .......................................................... 280/511
See application file for complete search history.

(56) References Cited

U.S. PATENT DOCUMENTS

2017/0267040 A1* 9/2017 Pulliam .................... B60D 1/07
2019/0329614 A1* 10/2019 Borkholder ........... B60D 1/248

* cited by examiner

*Primary Examiner* — Valentin Neacsu
*Assistant Examiner* — Mohamed M Medani
(74) *Attorney, Agent, or Firm* — Sanders Pianowski LLP

(57) ABSTRACT

A ball mount is formed from a plurality of components that are only cut from flat sheet metal. The components are two identical sides, two identical bridge plates, and one ball mount plate that are assembled and then welded together to form a rigid assembly. The sides have a plurality of slots to receive complementary tabs located on the bridge plates, along with apertures to locate the ball mount plate. The bridge plates have lateral edges that set the distance between the sides. A stacked receiver can be used with the ball mount that is also formed without bending. The stacked receiver has sides and partition plates that are cut from sheet metal, along with a length of tubing that are assembled and then welded together.

13 Claims, 8 Drawing Sheets

HITCH AND METHOD OF MANUFACTURE

BACKGROUND OF THE INVENTION

The present disclosure relates to hitches, draw bars, towing, and methods of manufacturing these goods. Draw bars and ball mounts are primarily manufactured with a hollow tube being welded to flat stock to receive a hitch ball. In many applications, the flat stock is bent or formed to vertically offset the ball from the draw bar portion. For heavy-duty applications, a solid bar is used instead of a hollow tube. In either event, the storage and shipping of raw materials (hollow tube and solid bar stock) is more costly, space-consuming, and requires inventory control. Bending and forming of flat stock is an additional process that requires additional equipment. Metal forming can create other tolerance issues that require controls. In addition, by using a hollow tube that closely matches the shape of the receiver on a vehicle, rust can build up in the receiver and effectively fuse the receiver and hitch together. For these reasons, an improved hitch and method of manufacturing the same are needed.

SUMMARY OF THE INVENTION

The present disclosure describes a ball mount and method of manufacturing using an assembly of flat components. The ball mount is used by itself or with a stacked receiver, which is also made primarily from an assembly of flat components. The flat components are cut or stamped from flat sheet metal and are assembled without forming or bending. Once assembled, the components are welded together to form a rigid unit.

The ball mount has two identical sides. Each side is formed from planar material having a first planar surface and a second planar surface to define a first thickness. The side has a top edge and a bottom edge parallel thereto, along with a ball mount slot extending through the side with an upper edge of the ball mount slot being coplanar with an upper ball surface. The side has a ball support ledge being coplanar with a lower edge of the ball mount slot, along with upper bridge apertures and lower bridge apertures. The ball mount has two identical bridge plates. Each bridge plate is formed from planar material and has parallel lateral edges spaced from each other by a first distance and tabs extending beyond the lateral edges. The ball mount has a ball mount plate formed from planar material having an upper planar surface and lower planar surface to define a second thickness. The second thickness is greater than the first thickness. The ball mount plate has a narrowed portion with lateral edges spaced from each other by a width equal to the first distance. The narrowed portion of the ball mount plate is located between an anchoring portion and a ball mount portion. The anchoring portion has posts extending beyond the lateral edges.

As assembled, a first bridge plate is affixed between a first side and a second side with the tabs located in the upper bridge apertures of the sides. A second bridge plate is affixed between the first and second side and parallel to the first bridge plate with the tabs located in the lower bridge apertures of the sides. The ball mount plate is affixed between the first and second sides. The lateral edges of the bridge plates and the lateral edges of the ball mount plate abut one of the planar surfaces on each of the sides.

The ball mount is constructed using the following steps: First, a first side is formed without bending by cutting from a first planar sheet, the first planar sheet having a first thickness. Cutting slots in the first side extending through the first thickness. Next, forming without bending a second side identical to the first side.

A first bridge plate is formed without bending by cutting from the first planar sheet, the first bridge plate having tabs extending beyond lateral edges. Next, forming without bending a second bridge plate identical to the first bridge plate.

A ball mount plate is formed without bending by cutting from a second planar sheet. A ball mount aperture is cut in the ball mount plate. The ball mount plate has posts extending therefrom. The second planar sheet having a second thickness.

The parts are assembled by positioning the ball mount plate and the bridge plates between the sides. The tabs from the bridge plates are inserted into the slots in the sides while simultaneously inserting the posts from the ball mount plate into ball mount slots in the sides. The width is determined by abutting the lateral edges of the bridge plates to interior facing surfaces of the sides. The entire assembly is fixed by welding the sides to the bridge plates and the ball mount plate.

DESCRIPTION OF THE PREFERRED EMBODIMENT

Figure 1:
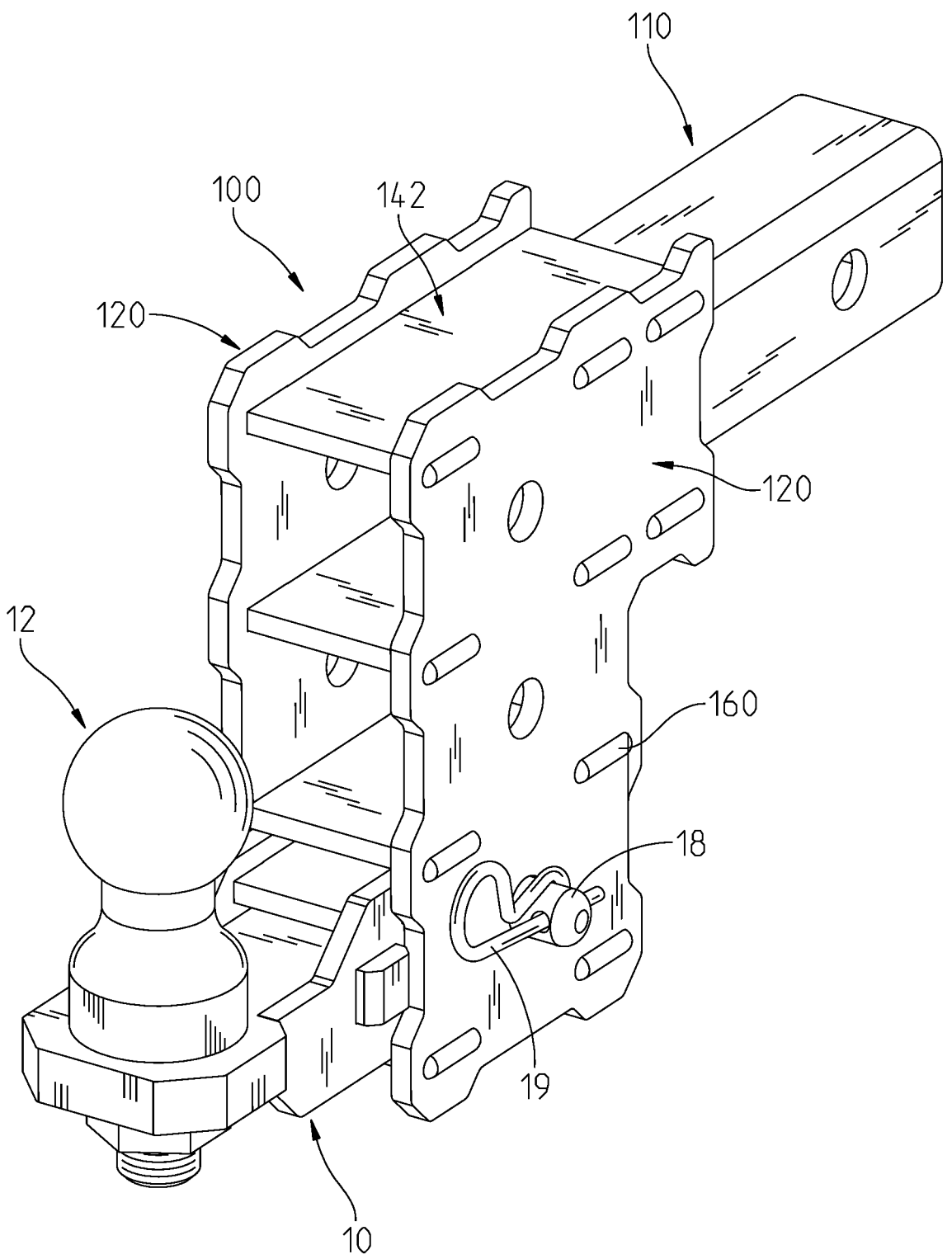
FIG. 1 is an isometric view of a ball mount assembled to a stacked receiver.

A ball mount 10 that holds a hitch ball 12 and works with a vehicle-mounted receiver (not shown) or stacked receiver 100 is shown in FIG. 1. Ball mount 10 is made up of sides 20, bridge plates 50, and a ball mount plate 70 and has a height 14 and width 16 that fits one of the receivers 102, 104, 106 in the stacked receiver 100 or vehicle-mounted receiver. The ball mount 10 is secured with a hitch pin 18 and retaining clip 19. These components are cut, assembled, and welded together without bending or otherwise forming any of the components.

Figure 3:
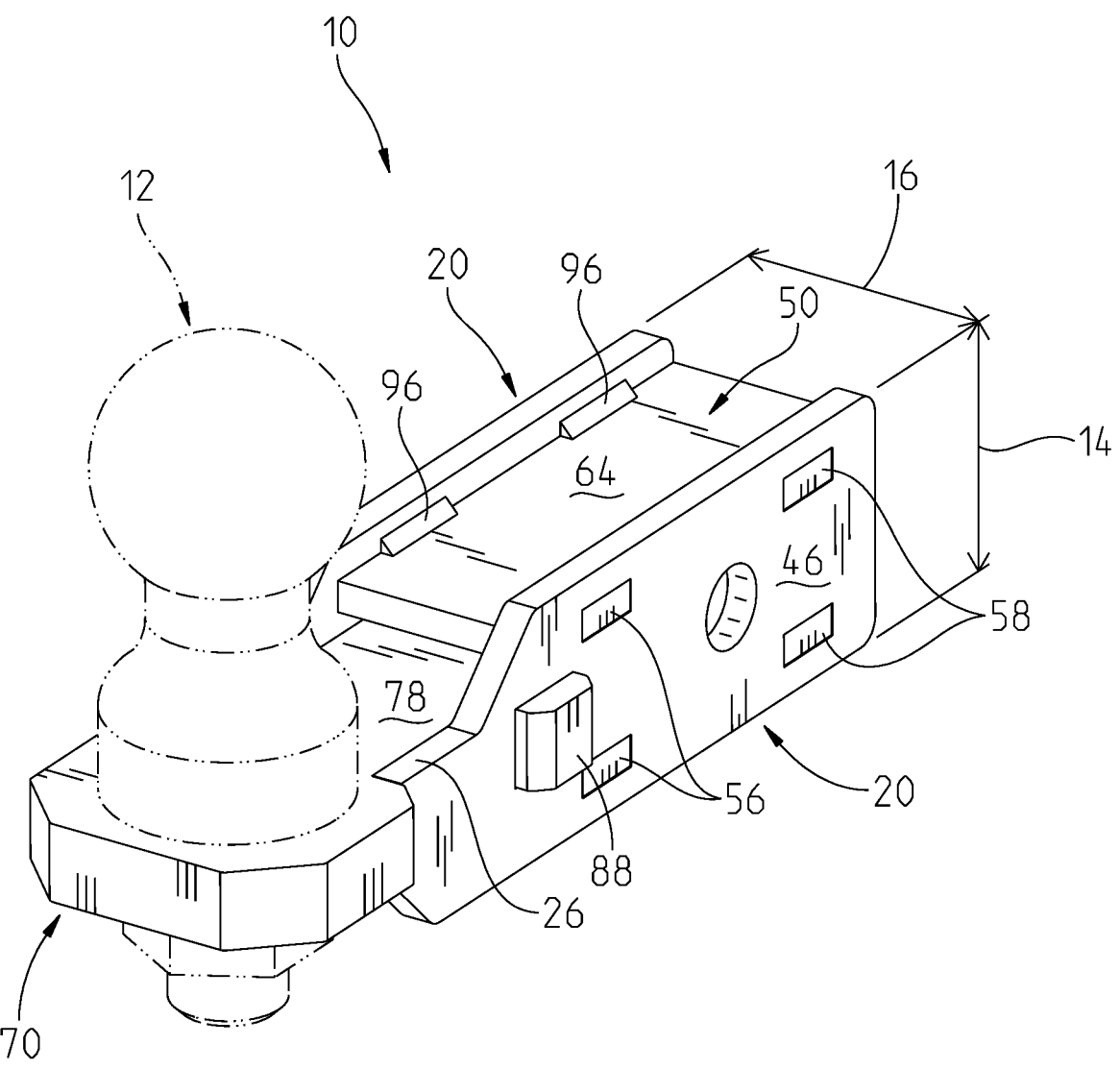
FIG. 3 is a top isometric view of the ball mount shown in FIG. 2.
Figure 4:
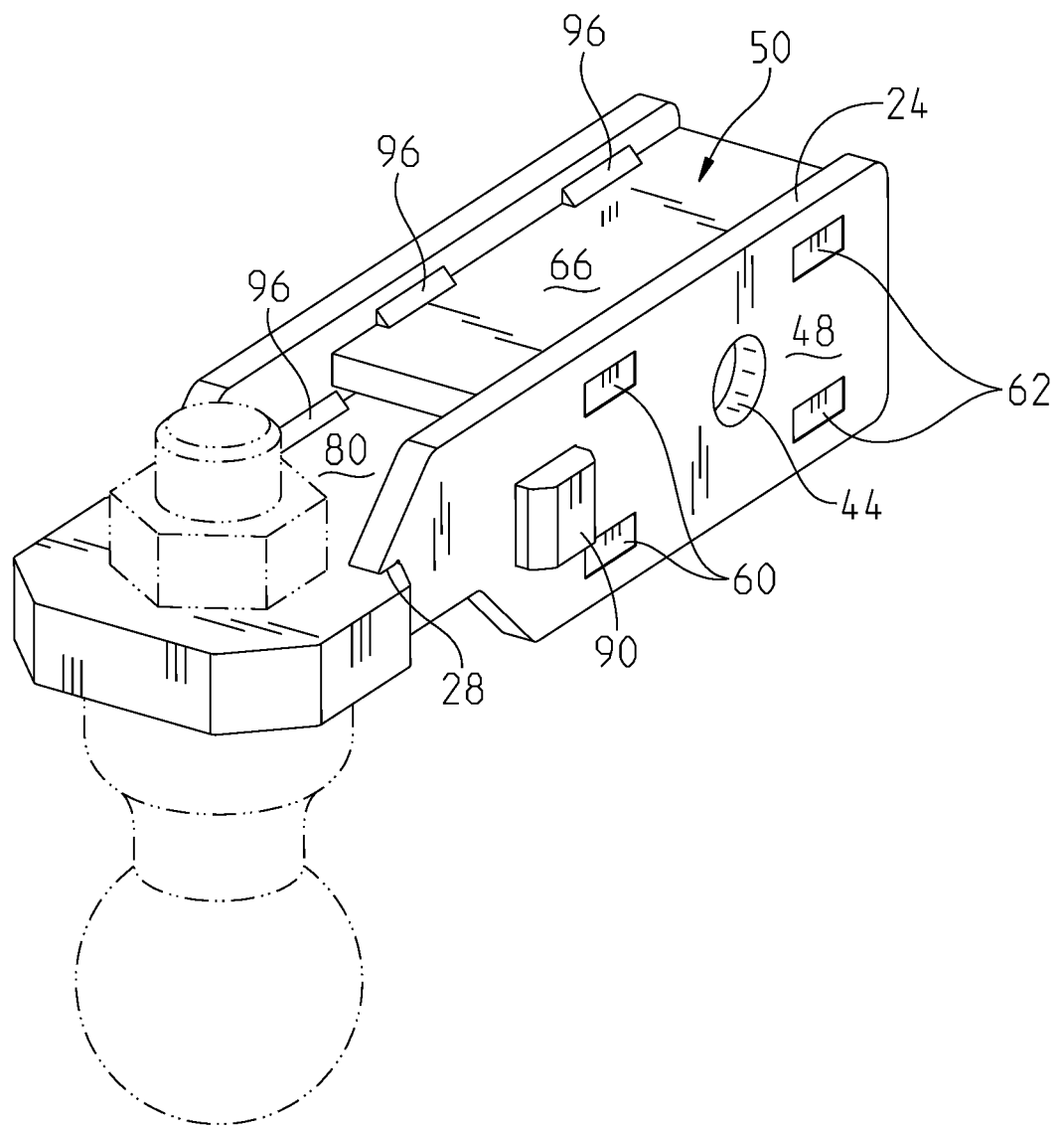
FIG. 4 is a bottom isometric view of the ball mount shown in FIG. 2.
Figure 5:
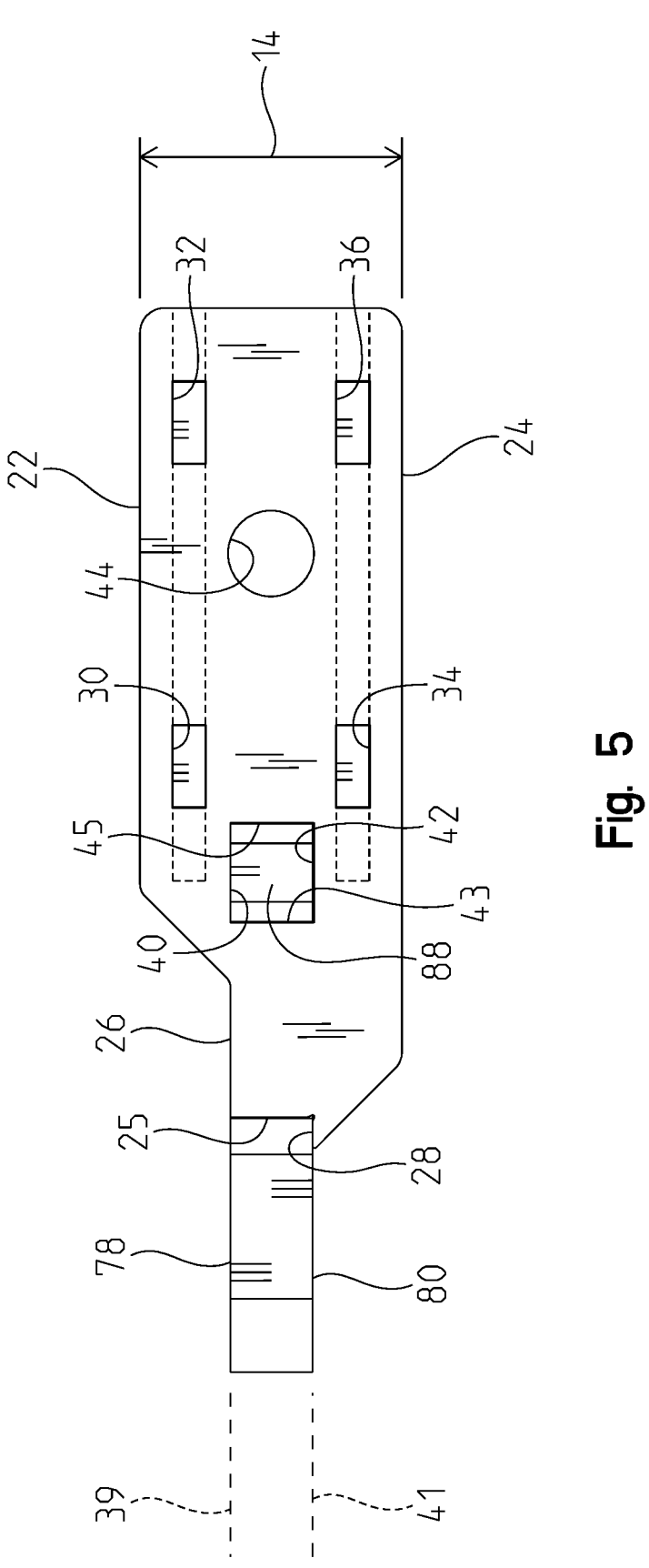
FIG. 5 is a right side view of the ball mount shown in FIG. 2, the left side view being mirror symmetrical.
Figure 6:
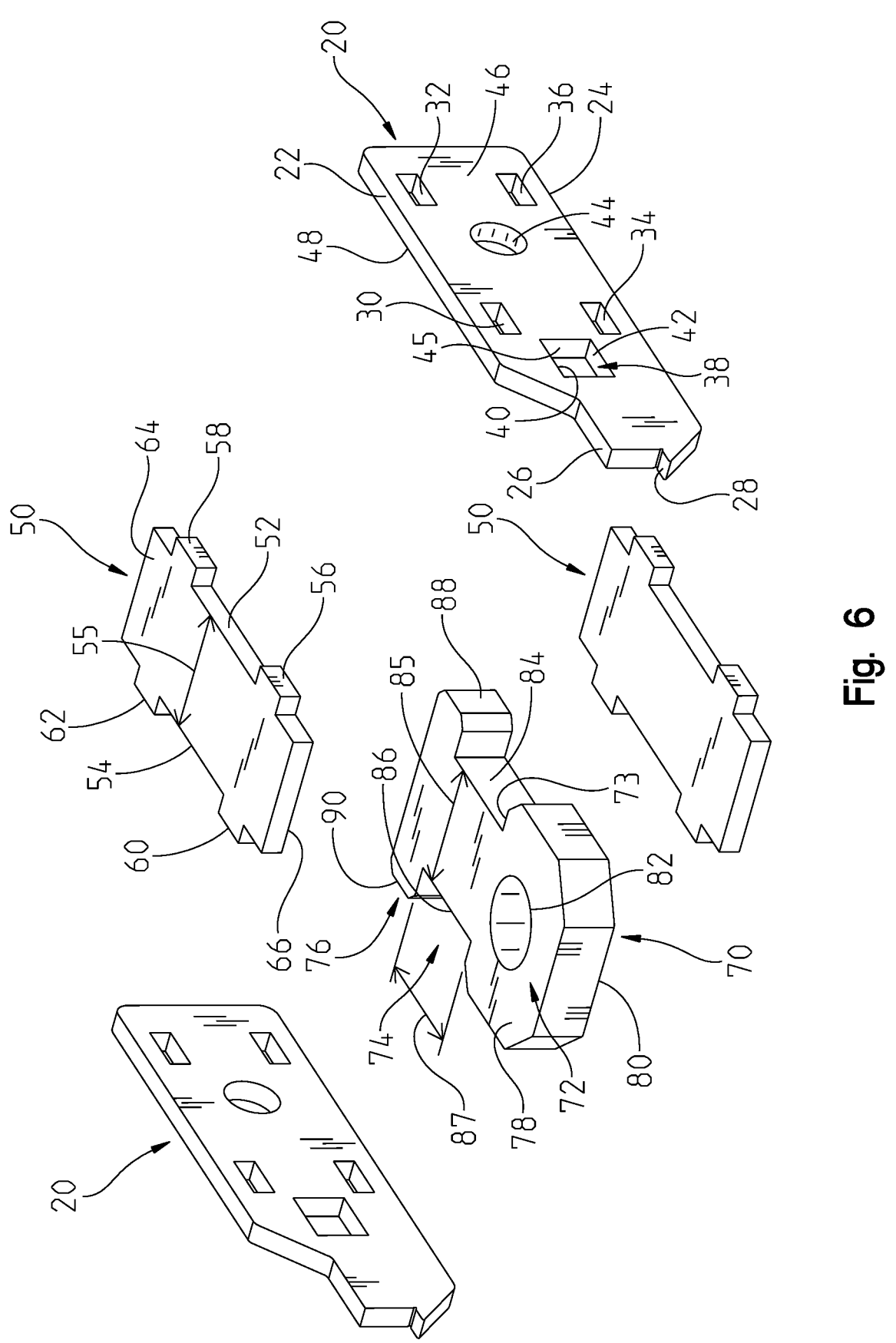
FIG. 6 is an exploded isometric view of the ball mount in FIG. 3.

Ball mount 10 is shown individually in FIGS. 3-6. As is shown in the exploded view of FIG. 6, sides 20 are identical. Each side 20 has a top edge surface 22 and an opposing bottom edge surface 24. The edge surfaces 22, 24 are parallel to each other and spaced apart by a distance equal to the height 14. In addition to edge surfaces 22, 24, a ball surface 26 is parallel to the edge surfaces 22, 24. A stop surface 25 extends perpendicularly between ball surface 26 and a ball support ledge 28. Located between edge surfaces 22, 24 are a plurality of apertures. A pair of upper bridge apertures 30, 32 are located adjacent to the top edge surface 22. Likewise, a pair of lower bridge apertures 34, 36 are located adjacent the bottom edge surface 24. As can be seen in FIG. 5, the upper bridge apertures 30, 32 are coplanar. The lower bridge apertures 34, 36 are also coplanar. A ball mount slot 38 has an upper edge 40 that is located on an upper ball plane 39, along with the ball surface 26. A lower edge 42 is located on a lower ball plane 41, along with the ball support ledge 28. Along with the upper and lower edges 40, 42, the ball mount slot 38 has a forward edge 43 and a rearward edge 45 that defines the ball mount slot 38. A round hitch pin aperture 44 is located at a midpoint between the edge surfaces 22, 24. Each side 20 is cut or stamped from flat sheet stock (such as sheet metal) with a first planar surface 46 and an opposing second planar surface 48 that defines its thickness 49. Other thicknesses are contemplated, but in the embodiment shown herein, the thickness 49 is 0.25" or 15,875 mm. The sides 20 are made without bending and remain planar.

Bridge plates 50 are also identical, and like the sides 20, these are also made by being cut from sheet metal without bending and remain planar. Each bridge plate 50 has a first lateral edge 52 and an opposing second lateral edge 54. The lateral edges 52, 54 are parallel to each other. Extending beyond the lateral edges 52, 54 are tabs 56, 58, 60, 62. Tabs 56, 58 extend beyond the first lateral edge 52 and tabs 60, 62 extend beyond the second lateral edge 54, As with the sides 20, the bridge plates 50 have a first planar surface 64 and an opposing second planar surface 66 to define its thickness 49. In the embodiment shown herein, the thickness 49 of the sides 20 and bridge plates 50 are the same.

The ball mount plate 70, also cut from sheet metal without bending, has three portions: a ball attachment portion 72, a narrowed portion 74, and an anchoring portion 76. The ball mount plate 70 has an upper planar surface 78 and an opposing lower planar surface 80 to define its thickness 81. The ball mount plate 70 is cut or stamped from flat sheet stock that is thicker than the sheet stock used for the sides 20 or bridge plates 50. Other thicknesses are contemplated, but in the embodiment shown herein, the thickness 81 is 0.625" or 15.875 mm. As with the sides 20 and bridge plates 50, the ball mount plate 70 is not bent and remains planar. Portions 72, 74, 76 are merely designated areas on the ball mount plate 70 and do not reflect individual components. The planar surfaces 78, 80 extend uninterrupted across the portions 72, 74, 76. The ball attachment portion 72 has a ball mount aperture 82 that allows the hitch ball 12 to be affixed. The narrowed portion 74 has lateral edges 84, 86 that are spaced from each other by a distance 85 equal to the distance 55 between lateral edges 52 and 54. The anchoring portion 76 has a first post 88 and a second post 90 that extend outwardly from corresponding lateral edges 84, 86. As can be seen in FIG. 5, part of the anchoring portion 76 of the ball mount plate 70 is located between the upper and lower bridge plates 50. The posts 88, 90 are spaced from backstop walls 73 on the ball attachment portion 72 by a distance 87, which matches the distance between the stop surface 25 and forward edge 43.

Figure 7:
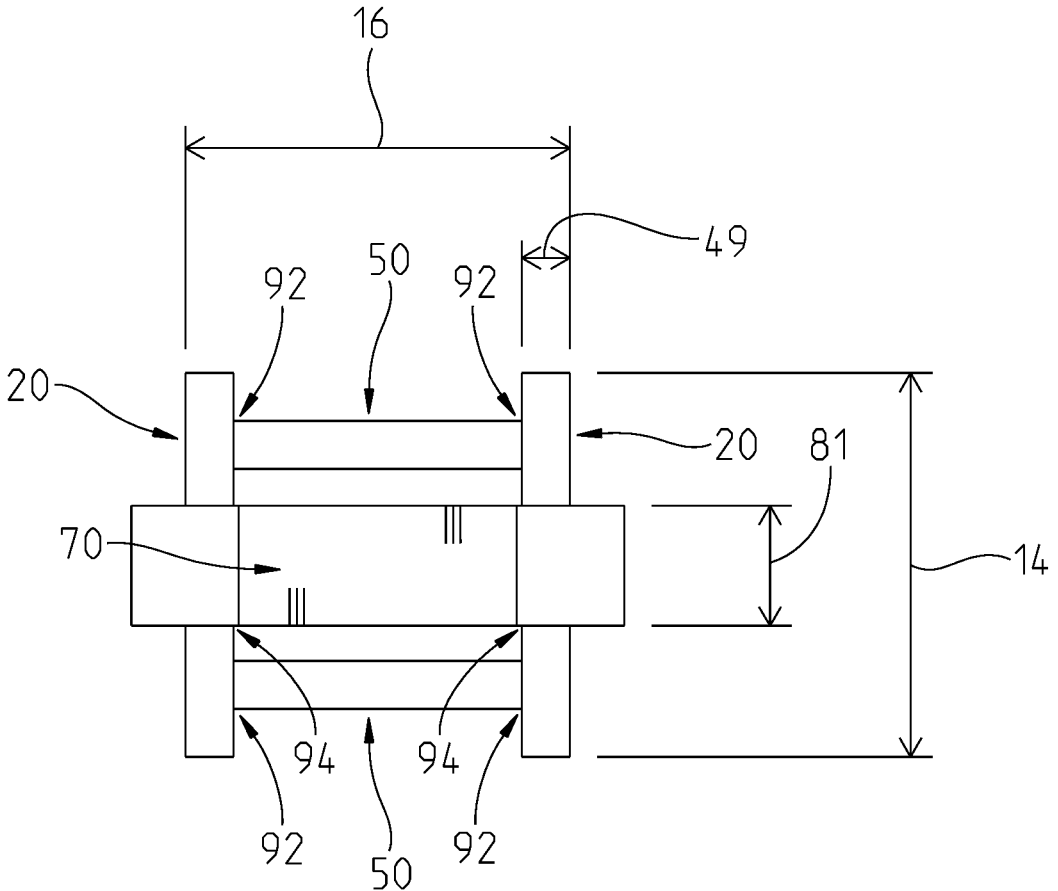
FIG. 7 is a front view of the ball mount shown in FIG. 2.

To assemble the ball mount 10, the ball mount plate 70 and two bridge plates 50 are positioned between the sides 20. An upper bridge plate 50 is positioned such that tabs 56 and 60 are aligned with the bridge apertures 30 for each side, tabs 58 and 62 are aligned with bridge apertures 32 for each side 20. A lower bridge plate 50 is positioned such that tabs 56 and 60 are aligned with the bridge apertures 34 for each side, tabs 58 and 62 are aligned with bridge apertures 36 for each side 20. The ball mount plate 70 is positioned such that posts 88 and 90 extend through ball mount slots 38 for each side 20. Tabs 56, 58, 60, and 62 are shorter than or equal to the thickness of the sides 20 and therefore do not extend beyond planar surface 46 for one side and planar surface 48 for the opposite side. Posts 88 and 90 are longer than the thickness of the sides 20 and extend beyond the corresponding planar surfaces 46, 48 as shown in FIGS. 1-4. The ball attachment portion 72 is also wider and extends beyond the outside-facing planar surfaces 46, 48 of the sides 20. Further, planar surface 78 is coplanar with the upper ball plane 39 and ball surface 26 for each side. Planar surface 80 is coplanar with the lower ball plane 41 with a portion overlaying and contacting the ball support ledge 28 for each side. This is shown in FIG. 5. As assembled, inside corners 92 are formed where bridge plates 50 meet the sides 20, along with inside corners 94 being formed where the ball mount plate 70 meets the sides 20. These are shown in FIGS. 3, 4, and 7. Once assembled, portions of inside corners 92, 94 are welded to make the assembly permanent. The width of bridge plates 50 and the narrowed portion 74 (as defined by the distance between lateral edges 52 and 54, along with 84 and 86 respectively) and the thickness of the sides 20 sets the width 16 of the drawbar portion. The distance between edge surfaces 22, 24 sets the height 14 as shown in FIG. 3.

Figure 2:
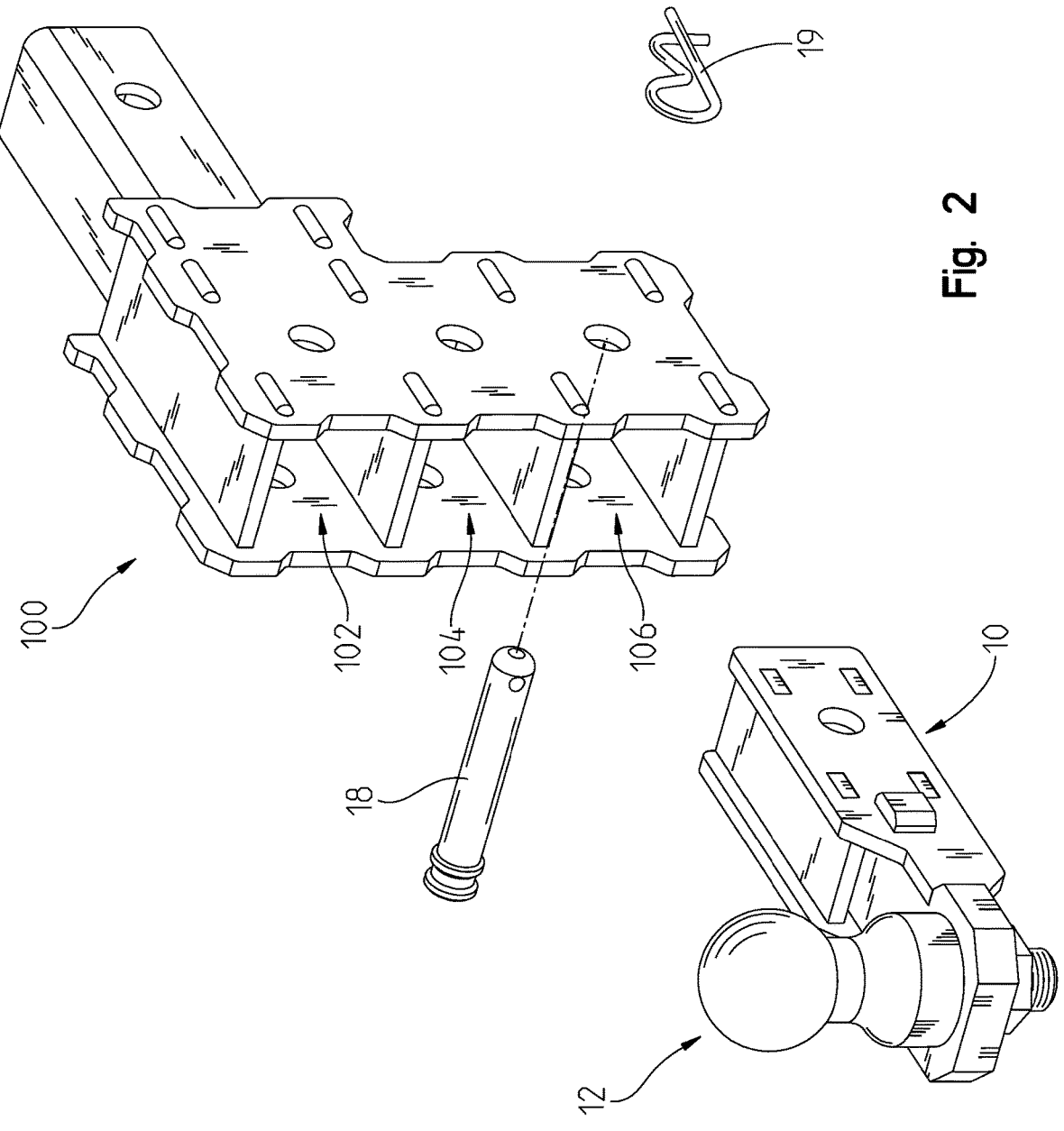
FIG. 2 is an exploded isometric view of the ball mount and stacked receiver of FIG. 1.
Figure 8:
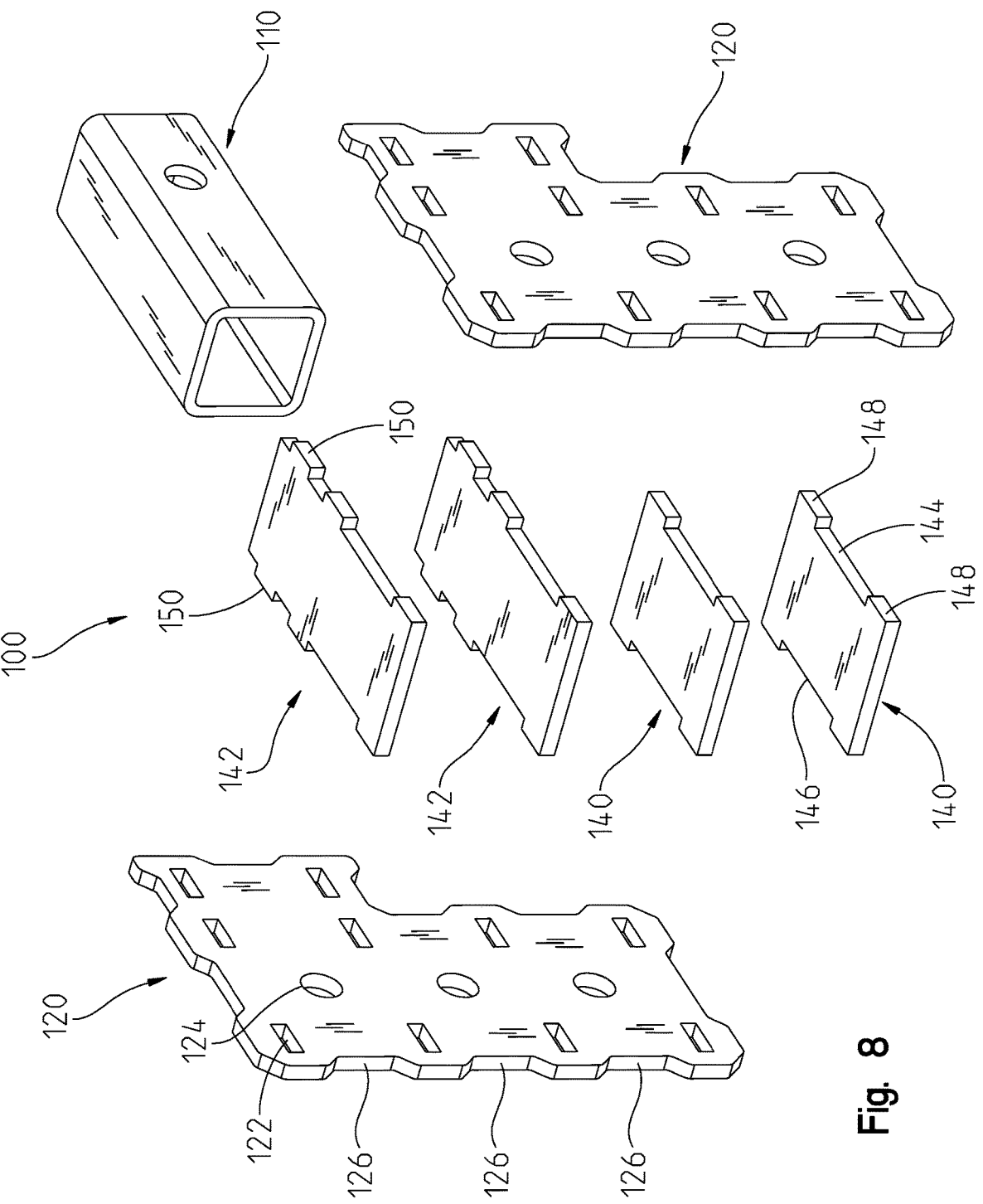
FIG. 8 is an exploded isometric view of the stacked receiver in FIG. 2.

The stacked receiver 100 is shown in FIGS. 1, 2, and 8 and is also assembled from a plurality of flat components. The only non-flat component in the stacked receiver 100 is the draw bar 110, which is a length of square tubing, shown in FIG. 8. Receiver sides 120 are identical, with each side having tab apertures 122. The tab apertures 122 are located in parallel and planar rows to receive tabs 148, 150 that extend from partition plates 140, 142. Receiver sides 120 also contain locking pin apertures 124 that align with the hitch pin apertures 44 when the ball mount 10 is inserted into one of the receivers 102, 104, 106. As shown in the FIGS., there are three receivers in the embodiment shown herein, but this disclosure is not limited thereto and a different number of receivers are contemplated. Receiver sides 120 also contain a clearance notch 126 for each receiver. In the embodiment shown herein, there are three clearance notches 126. Clearance notches 126 prevent the posts 88, 90 from contacting the receiver sides 120 before the hitch pin aperture 44 aligns with the corresponding locking pin aperture 124. This is visible in FIG. 1.

Partition plate 140 has lateral edges 144, 146 and tabs 148 that extend outwardly from the lateral edges 144, 146. The lateral edges 144, 146 are spaced apart by a distance greater than the width 16 of the ball mount 10. By making the distance greater than the width 16 of the ball mount 10, there is clearance between the ball mount 10 and respective receivers 102, 104, 106. Extended partition plate 142 is similar to partition plate 140, except that it is longer and contains an additional pair of tabs 150.

To assemble the stacked receiver 100, the partition plates 140, 142 and draw bar 110 are positioned between receiver sides 120. In particular, partition plates 142 are located on either side of the draw bar 110 and partition plates 140 are located in the remaining areas of the sides with the tabs 148, 150 located in the tab apertures 122. Once these are assembled, the tabs 148, 150 are welded 160 to the receiver sides 120, along with the draw bar 110.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A ball mount, comprising:

an identical pair of unbent flat sides having a first thickness, each said side having:

a top edge and a bottom edge parallel thereto;

a ball mount slot extending through said first thickness, a top edge of said ball mount slot is coplanar with an upper ball surface and parallel to said top and bottom edges, a ball support ledge is coplanar with a bottom edge of said ball mount slot; and a plurality of slots extending through said first thickness;

an identical pair of unbent flat bridge plates, each said bridge plate having:

parallel lateral edges spaced from each other by a first distance; and tabs extending beyond said lateral edges;

an unbent flat ball mount plate having an upper surface and lower surface to define a second thickness, said second thickness is greater than said first thickness, said ball mount plate having a narrowed portion having a width equal to said first distance; and said ball mount plate and said bridge plates affixed to and located between said sides, said tabs located in said slots, said lower surface contacting said ball support ledge and said top surface coplanar with said upper ball surface.

2. The ball mount in claim 1, wherein each said bridge plate has a thickness equal to said first thickness, said plurality of slots in each said side are complementary to said tabs on said bridge plates.

3. The ball mount in claim 1, further comprising a stacked receiver for receiving said ball mount, said stacked receiver comprising:

a draw bar formed from a length of square tubing;

an identical pair of flat receiver sides, each said receiver side having tab apertures;

a pair of partition plates having tabs that extend from lateral edges;

a pair of extended partition plates having tabs that extend from lateral edges, said extended partition plates having more tabs than said partition plates;

said tabs of said partition plates and said extended partition plates located in corresponding said tab apertures to form a plurality of receivers; and said receiver sides and said extended partition plates surrounding and enclosing one end of said draw bar.

4. The ball mount in claim 1, wherein said first thickness is either equal to half of said second thickness or less than half of said second thickness.

5. A ball mount, comprising:

a first side and a second side formed from planar material having a first planar surface and a second planar surface to define a first thickness, said side having a top edge and a bottom edge parallel thereto, a ball mount slot extending through said side with an upper edge of said ball mount slot being coplanar with an upper ball surface, said side having a ball support ledge being coplanar with a lower edge of said ball mount slot, said side having upper bridge apertures and lower bridge apertures;

a bridge plate formed from planar material, said bridge plate having parallel lateral edges spaced from each other by a first distance, said bridge plate having tabs extending beyond said lateral edges;

a ball mount plate formed from planar material having an upper planar surface and lower planar surface to define a second thickness, said second thickness is greater than said first thickness, said ball mount plate having a narrowed portion with lateral edges spaced from each other by a width equal to said first distance, said narrowed portion located between an anchoring portion and a ball mount portion, said anchoring portion having posts extending beyond said lateral edges;

a first said bridge plate affixed between a first said side and a second said side, said tabs located in said upper bridge apertures of said sides;

a second said bridge plate affixed between said first side and said second side and parallel to said first said bridge plate, said tabs located in said lower bridge apertures of said sides;

said ball mount plate affixed between said first side and said second side; and said lateral edges of said bridge plates and said lateral edges of said ball mount plate abutting one of said planar surfaces on each of said sides.

6. The ball mount of claim 5, wherein said lower planar surface overlays and contacts said ball support ledge.

7. The ball mount of claim 5, wherein said upper planar surface is coplanar with said upper ball surface.

8. The ball mount of claim 5, wherein said bridge plates are formed from planar material equal to said first thickness.

9. The ball mount of claim 5, wherein said sides, said bridge plates, and said ball mount plate are all unbent.

10. The ball mount of claim 5, wherein said sides, said bridge plates, and said ball mount plate have a consistent thickness.

11. The ball mount of claim 5, wherein said top edge and said bottom edge of said sides define a height of said ball mount.

12. The ball mount of claim 5, wherein said thickness of said first and second sides and said first distance between said lateral edges of said bridge plates defining a width of said ball mount.

13. The ball mount of claim 5, wherein said bridge plates are recessed from said top and bottom edges of said sides.

* * * * *